US007718241B2

(12) United States Patent
Wittmeyer, Jr.

(10) Patent No.: US 7,718,241 B2
(45) Date of Patent: May 18, 2010

(54) MULTI-FUNCTIONAL STACK OF REPOSITIONABLE SHEETS

(75) Inventor: Larry E. Wittmeyer, Jr., 24 O St., Lake Lotawana, MO (US) 64086

(73) Assignee: Larry E. Wittmeyer, Jr., Lake Lotawana, MO (US)

(*) Notice: Subject to any disclaimer, the term of this patent is extended or adjusted under 35 U.S.C. 154(b) by 0 days.

(21) Appl. No.: 10/797,956

(22) Filed: Mar. 11, 2004

(65) Prior Publication Data

US 2005/0095384 A1 May 5, 2005

Related U.S. Application Data

(63) Continuation-in-part of application No. 29/193,144, filed on Nov. 4, 2003, now abandoned.

(51) Int. Cl.

| | |
|---|---|
| ***B32B 9/00*** | (2006.01) |
| ***B41M 5/00*** | (2006.01) |
| ***B29C 73/06*** | (2006.01) |
| ***B29C 65/00*** | (2006.01) |
| ***B31F 1/20*** | (2006.01) |
| ***B60J 10/00*** | (2006.01) |
| ***B27D 1/08*** | (2006.01) |

(52) U.S. Cl. ................... 428/40.1; 428/195.1; 156/197; 156/196; 156/210; 156/221; 156/222; D21/468; D21/471

(58) Field of Classification Search ................. 156/197, 156/196, 210, 221, 222; D21/468, 471; 428/40.1, 428/195.1

See application file for complete search history.

(56) References Cited

U.S. PATENT DOCUMENTS

| | | | | |
|---|---|---|---|---|
| 2,415,012 | A | | 1/1947 | James |
| RE24,906 | E | | 12/1960 | Ulrich |
| 3,691,140 | A | | 9/1972 | Silver |
| 3,857,731 | A | | 12/1974 | Merrill, Jr. et al. |
| 4,166,152 | A | | 8/1979 | Baker et al. |
| 4,495,318 | A | | 1/1985 | Howard |
| 5,032,460 | A | | 7/1991 | Kantner et al. |
| 5,045,569 | A | | 9/1991 | Delgado |
| 5,202,190 | A | | 4/1993 | Kantner et al. |
| 5,390,819 | A | * | 2/1995 | Kaye ........................... 221/45 |
| 5,417,345 | A | | 5/1995 | Smith |
| 5,569,317 | A | | 10/1996 | Sarada et al. |
| 5,571,617 | A | | 11/1996 | Cooprider et al. |
| 5,595,829 | A | | 1/1997 | Pitts et al. |
| 5,611,958 | A | | 3/1997 | Takeuchi et al. |
| 5,766,324 | A | | 6/1998 | Ikegaya et al. |

(Continued)

OTHER PUBLICATIONS

Product Information from 3M web site on Post-it® Pop-up Dispenser Notes (2 pg.) located at http://www.3m.com/us/office/postit/rpoducts_notes_popup_notes.

(Continued)

*Primary Examiner*—Victor S Chang
(74) *Attorney, Agent, or Firm*—Stinson Morrison Hecker LLP

(57) ABSTRACT

A multi-functional stack of flexible sheet material containing a plurality of flexible sheets printed with sequential images and stacked with high peel adhesion along alternate opposite edges. The stack functions like a recreational accordion-like toy and animation flip pad.

16 Claims, 6 Drawing Sheets

U.S. PATENT DOCUMENTS

| | | | |
|---|---|---|---|
| 5,958,135 | A | 9/1999 | Pierre |
| 6,321,910 | B1 | 11/2001 | Bates et al. |
| 6,406,244 | B1 | 6/2002 | Le Riche |
| 6,669,992 | B2 | 12/2003 | Le Riche |

OTHER PUBLICATIONS

U.S. Appl. No. 29/193,144, filed Nov. 4, 2003, "Notepad".

Decision on Appeal dated Feb. 24, 2009, issued in U.S. Appl. No. 29/193,144, filed Nov. 4, 2003.

* cited by examiner

MULTI-FUNCTIONAL STACK OF REPOSITIONABLE SHEETS

CROSS-REFERENCE TO RELATED APPLICATIONS

This application is a continuation-in-part application of U.S. Design patent application Ser. No. 29/193,144, filed on Nov. 4, 2003, now abandoned which is hereby incorporated herein by reference.

STATEMENT REGARDING FEDERALLY SPONSORED RESEARCH OR DEVELOPMENT

Not Applicable.

BACKGROUND OF THE INVENTION

1. Field of the Invention

The present invention relates to a multi-functional stack of flexible sheet material, such as those used in repositionable notes, and a method of using the sheet material as a recreational toy. The stack contains a plurality of flexible sheets with each sheet attached to the other by repositionable adhesive along one edge but free of adhesive along the opposite edge. The sheets are stacked with the repositionable adhesive edge of each sheet disposed along alternate opposite edges to maintain the sheets in the stack. The high peel adhesion between the sheets, which are preferably circular in shape, permits the stack to function both as a notepad and as a recreational SLINKY®-like or accordion-like toy. In addition, a series of images printed on the major surfaces of a plurality of the sheets enables the device to be used as an animation flip pad. The outer edges of the sheets may also be printed with ink to provide a readily perceptible image when the sheets are in the stacked position.

2. Description of Related Art

Dispensers containing stacks of flexible sheet material having adhesive on alternating edges are well known to those skilled in the art. For example, U.S. Pat. Nos. 5,417,345 and 6,669,992 both teach a stack of rectangular-shaped flexible sheet material comprising a plurality of sheets disposed one on top of another. Each sheet has repositionable adhesive along one edge and is free of adhesive along the opposite edge. The sheets are stacked with the repositionable adhesive edge of each sheet disposed along alternate opposite edges to maintain the sheets in the stack.

As these patents indicate, these stacks of flexible sheet material are typically used in a rectangular plastic or cardboard dispenser. More specifically, the stacks of flexible sheet material are designed so that the free end of the top sheet is disposed through an opening in the dispenser. When this free end is grasped and pulled in a direction to dispense the sheet, the adhesive pulls the edge of the next adjacent sheet from the stack and brings this free edge of the next adjacent sheet through the opening. Upon withdrawing the entire top sheet and the free edge of the adjacent sheet through the opening, the top sheet is easily separated from the next adjacent sheet by peeling the sheets apart.

These conventional stacks of flexible sheet material having adhesive on opposite alternative edges are limited in function in several ways. First, because the sheets must be dispensed one at a time from the dispenser, each sheet is designed to be easily removed from the adjacent sheet. This is usually achieved by a combination of weak adhesive and/or release coating that will allow minimal adhesion. In addition, the stacks of flexible sheets are designed to be dispensed in a dispenser that has a finite size. As discussed in U.S. Pat. No. 6,669,992, the number of sheets in the stack is typically between 10 and 100 sheets. Further, the stacks of flexible sheet material of the prior art are typically rectangular or square in shape so that they can be used in similarly-shaped dispensers. Lastly, because these sheets are used solely as a writing substrate, the sheets are not pre-printed with any images.

The present invention is directed to a multi-functional stack of flexible sheet material having adhesive on opposite alternating edges. In one aspect of the invention, the peel adhesion is substantially greater than that of the prior art flexible sheet materials. Further, the stack is typically circular in shape and prepared with at least 100 sheets or more. The stack functions as a both notepad and as a recreational SLINKY®-like or accordion-like toy.

In another aspect of the present invention, the multi-functional stack of flexible sheet material is pre-printed with a series of consecutive images on the major surfaces of the sheets to create an animated flip pad. Since the stack of flexible sheets has adhesive at alternate opposing edges, the images are preferably printed on the major surface of alternating sheets in the stack. The two sheets are flipped two at a time to create the animation by virtue of the adjacent sheets being adhered along alternate opposing edges. As such, the likelihood that an image in the series will not be viewed during the flipping process/action is decreased.

In accordance with the present invention, the stack of flexible sheet material may also include an image printed on the outer edges of the sheets so that when a plurality of sheets are stacked together, a peripheral image is readily viewable. The printed image, for example, may take the form of a soda can logo in a stack of circular flexible sheets.

BRIEF SUMMARY OF THE INVENTION

It is an object of the present invention to provide a stack of flexible sheet material that has multiple functionalities.

It is another object of the present invention to provide a stack of flexible sheet material comprising a plurality of non-folded sheets, each having a first major surface and an opposite second major surface extending between two substantially opposite edges, such that the sheets are disposed one on top of another and are coated with adhesive coated on the second major surface adjacent one opposite edge and are free of adhesive on the other opposite edge such that the sheets are stacked with the adhesive on successive sheets disposed on alternate adjacent opposite edges and the peel adhesion between the successive sheets is at least 150 g when the sheets are pulled laterally at 180 degrees.

It is a further object of the present invention to provide a stack of flexible sheet material which functions as a notepad and can also be adapted to walk and oscillate when it is bent into a generally semi-circular or arcuate form like a conventional SLINKY® toy It is another object of the present invention to provide a stack of flexible sheet material that functions as both a notepad and an animation flip pad.

Still a further object of the present invention is to provide a stack of flexible sheet material that functions as both a notepad and an aesthetically pleasing device by having a preprinted image on the outer periphery or edge of the stack.

Further aspects and advantages of the invention will become apparent after reviewing the brief description of the drawing figures and description of preferred embodiments which follow.

DETAILED DESCRIPTION OF THE INVENTION

Figure 1:
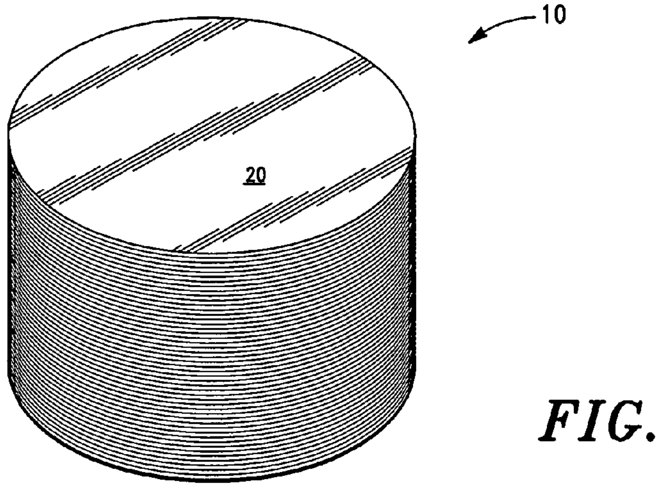
FIG. 1 is a front perspective view of a stack of flexible sheet material in accordance with one embodiment of the present invention.
Figure 2:
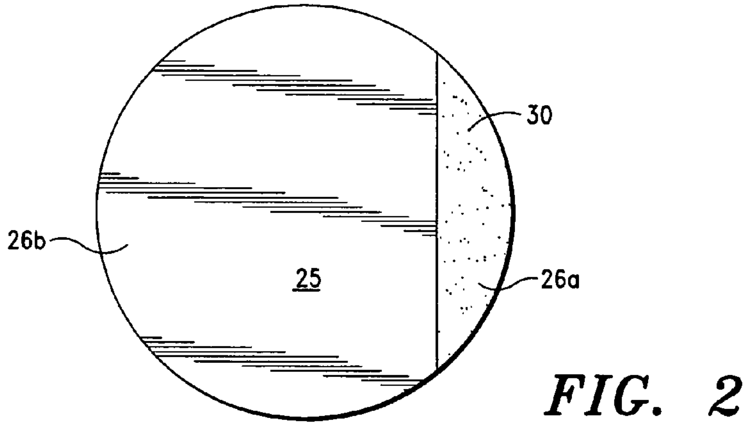
FIG. 2 is a bottom plan view of the stack of sheet material shown in FIG. 1.
Figure 3:
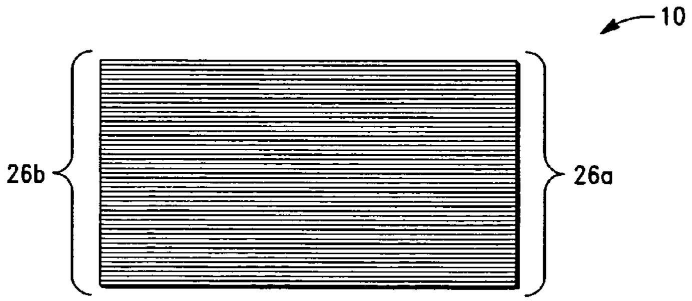
FIG. 3 is a front elevational view of the stack of sheet material shown in FIG. 1. The left and right side elevational views of the note pad are identical to the front elevational view shown in FIG. 3.
Figure 4:
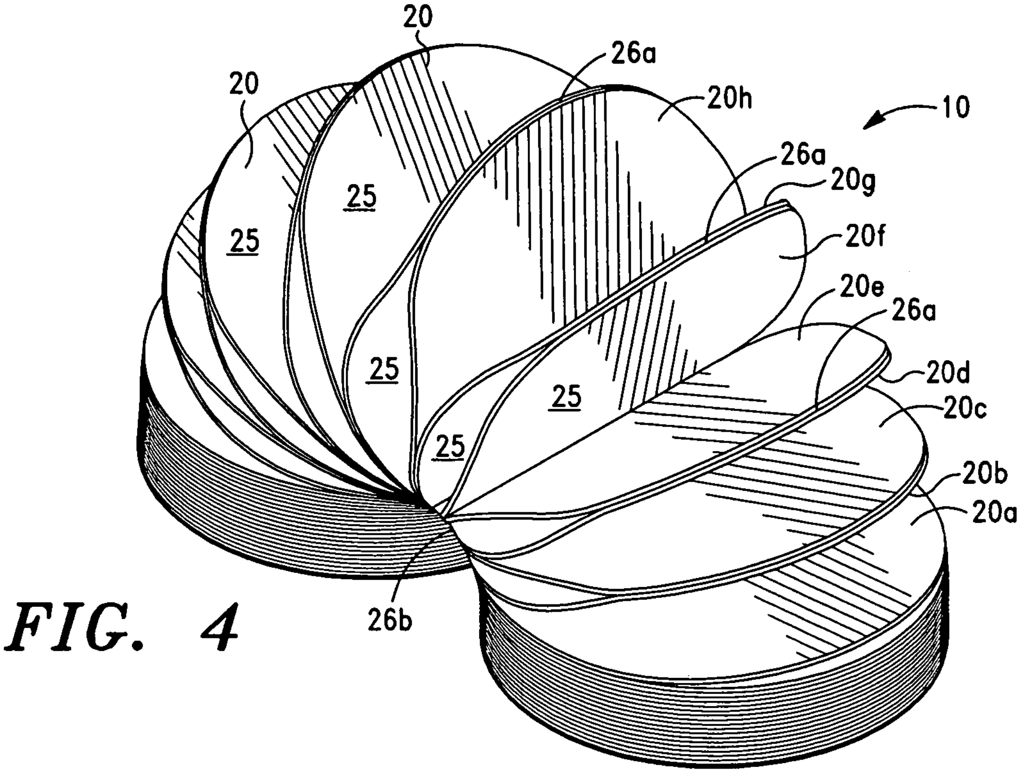
FIG. 4 is a front perspective view of the stack of sheet material shown in FIG. 1 having been expanded in a SLINKY®-like or accordion-like fashion.
Figure 5:
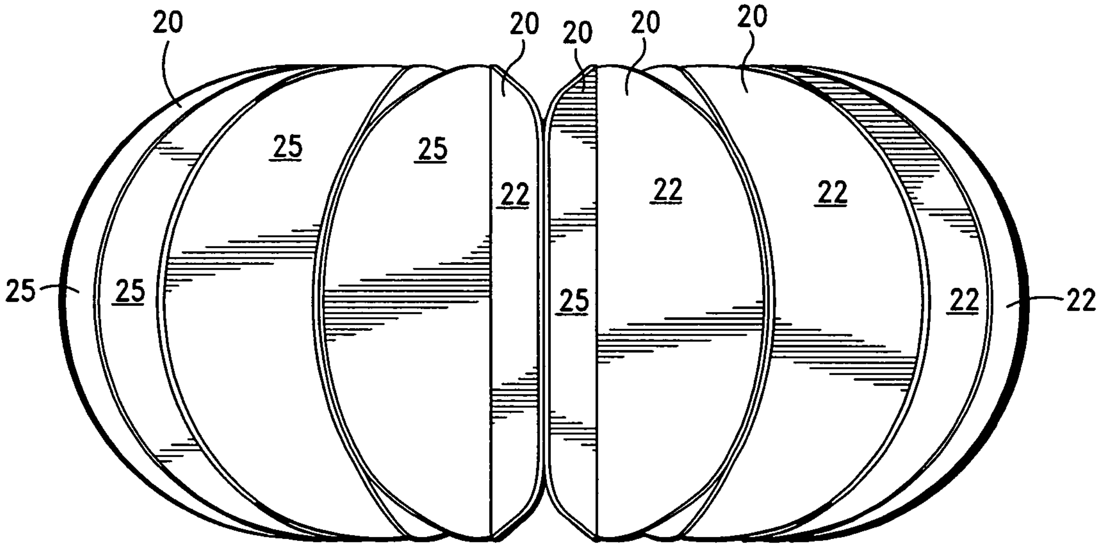
FIG. 5 is a top plan view of the stack of sheet material shown in FIG. 4.
Figure 6:
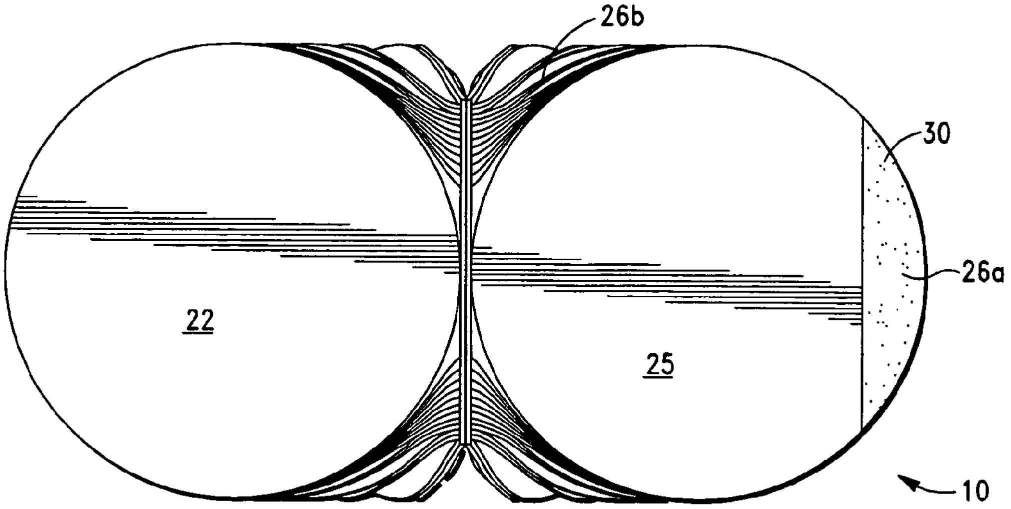
FIG. 6 is a bottom plan view of the stack of sheet material shown in FIG. 4.
Figure 7:
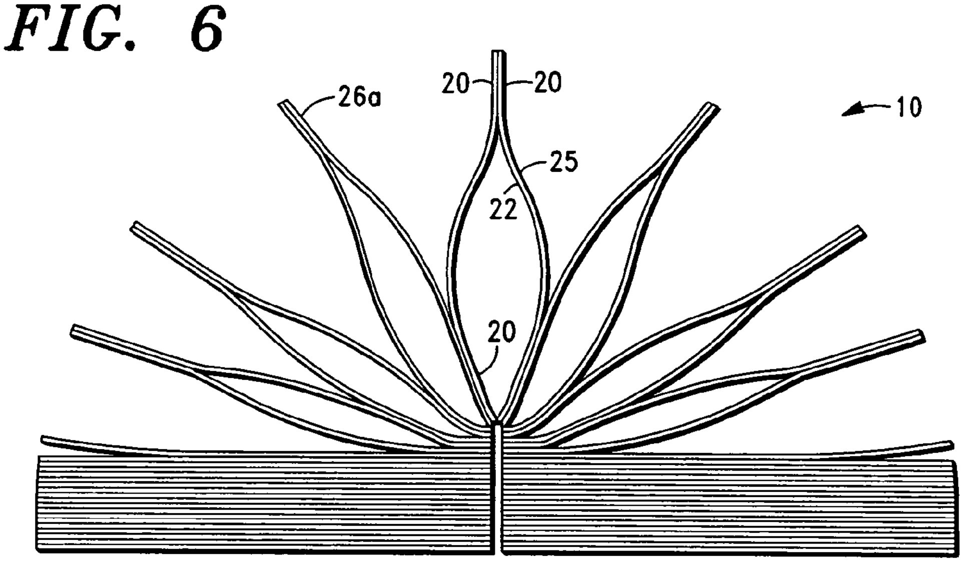
FIG. 7 is a front elevational view of the stack of sheet material shown in FIG. 4. The rear elevational view is identical to the front elevational view shown in FIG. 7.
Figure 8:
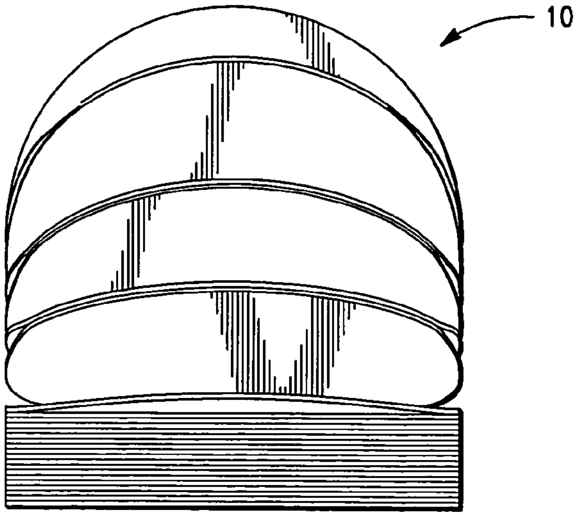
FIG. 8 is a left side elevational view of the stack of sheet material shown in FIG. 4. The right elevational view is identical to the left side elevational view shown in FIG. 8.

The present invention is directed to a multi-functional stack of flexible sheet material coated with adhesive on opposite edges of the sheets. In one aspect, the stack of flexible sheets are adhered together in a manner that exhibits high peel adhesion between the sheets to enable the stack to be used as a recreational toy. The stack is also preferably circular in shape and contains a large number of sheets so that it functions like a SLINKY® device, as well as a note pad. In another aspect, the stack of flexible sheet material of the present invention is pre-printed with a series of consecutive images on the major surfaces to create an animated flip pad. In still another aspect, the multi-functional stack of flexible sheet material includes an image printed on the outer edges of the sheets so that when a plurality of sheets are stacked together, the image is readily viewable.

The flexible sheet material of the present invention is made of any suitable substrate. The sheet material is preferably comprised of paper, vellum, or plastic film materials, such as polyethylene, polypropylene and polyester, including MYLAR® available from Dupont. Most preferably, the flexible sheet material is comprised of paper.

As is known in the art, the flexible sheet material may include a primer coating or release coating. In some instances, the flexible sheet material can be purchased pretreated with a primer coating on one side and release coating (or low adhesion backsize ("LAB")) on the other side. Suitable pretreated substrates are known in the art as "CF" or coated front. A preferred pretreated substrate is manufactured by Mead Paper Company as "Coated Front Carbonless Paper" or ("CF").

If a primer coating is desired, the primer coating may alternatively be applied to an uncoated substrate. Various suitable primer materials are well known to those skilled in the art. For example, U.S. Pat. No. 6,406,244 discloses a primer material made by mixing approximately 3-7% by weight of the binding agent MOWIOL available from Hoechst AG, Frankfurt/Main, Germany and approximately 3-8% by weight of the pigment AEROSIL available from Degussa AG, Frankfurt/Main, Germany with approximately 90% by weight of water. Other suitable primer coatings are well known to those skilled in the art, and include those referenced in Pierre, U.S. Pat. No. 5,958,135. A preferred primer coating is commercially available from Craig Adhesive & Coatings (Newark, N.J.) as Product No. 3991PR. It should be understood that the primer coating may be applied to the entire substrate or only on those portions of the sheet corresponding with adhesive.

If a release coating is desired, the release coating may alternatively be applied to the coated substrate. Various suitable release materials are also known to those skilled in the art. The release material may include, but is not limited to, acrylates, chrome complexes, silicone materials, urethanes, and fluoro chemicals. For example, EP-A-0618509 describes a release material comprising typically from about 5% to about 10% solid material. Other release materials that may be employed include those disclosed in U.S. Pat. Nos. 5,202,190 and 5,032,460. A preferred release coating is commercially available from Craig Adhesive & Coatings (Newark, N.J.) as Product No. 6960SIHV. A preferred water-based release coating is commercially available from Craig Adhesive & Coatings as Product No. 3991 REL. Again, it should be understood that the release coating may be applied to the entire substrate or only on those portions of the sheet corresponding with adhesive.

Various adhesives can be used in the present invention to achieve the high peel adhesion between the flexible sheets in the stack. Numerous products using repositionable sensitive adhesive are commercially available, as are the adhesive compositions themselves. The repositionable adhesive is preferably a repositionable microsphere pressure-sensitive adhesive, for example as described in U.S. Pat. Nos. 5,045,569; 4,495,318; 4,166,152; 3,857,731; 3,691,140; U.S. Pat. No. Re. 24906; U.S. Pat. No. 5,571,617 and EP-A-0439,941. Suitable microsphere adhesives are manufactured by National Starch, Franklin Adhesives, and Advanced Polymer International (e.g. GEL-TAC®). A preferred repositionable microsphere adhesive is manufactured by Advanced Polymer International and commercially available from Craig Adhesives & Coatings (Newark, N.J.) as Product No. 3991 PIL.

Turning now to the drawings, FIGS. 1-8 illustrate a multi-functional stack 10 of flexible sheet material 20 in accordance with a first embodiment of the present invention. The stack contains a plurality of sheets 20 with each sheet attached to the other by adhesive 30 along alternating edges. The high peel adhesion between the circular sheets permits the stack to function both as a notepad and as a recreational SLINKY®-like or accordion-like toy.

Each flexible sheet 20 in accordance with the present invention has a first major 22 surface and a second major surface 25 opposite to the first major surface. Along a first edge 26*a* of the second major surface, repositionable adhesive 30 is applied in any suitable manner. The adhesive is preferably in the form of a band, stripe, or spots.

In one aspect, the adhesive 30 covers about 1 to 50% of the surface area of the second major surface 25 of the sheets. Even more preferably, the adhesive covers about 2 to 35% of the surface area, and still more preferably about 5 to 25% of the surface area, and most preferably about 10 to 20% of the surface area.

The sheets 20 are stacked together with second major surface 25 of one sheet adhering to the first major surface 22 of the next sheet in the stack via the adhesive 30. The adhesive coating 30 alternates between two opposite edges 26*a*, 26*b* of the stack. In other words, with respect to two consecutive sheets 20 of the stack, one sheet in the stack will have the repositionable adhesive 30 along a first edge 26*a* of two opposite edges and will be free of repositionable adhesive along second edge 26*b* of the two opposite edges, and the next sheet in the stack will be free of repositionable adhesive along the first edge 26*a* and have repositionable adhesive along the second edge 26*b*. A backing or cover (not shown) may optionally be applied to the bottom sheet as is known to those skilled in the art.

In one aspect of the present invention, the stack 10 of flexible sheets 20 functions both as a notepad and as a movable recreational toy. In particular, the flexible sheets of the present invention are adhered together so that the stack can be used in a "SLINKY®-like" or "accordion-like" fashion.

The multi-functional stack 10 preferably exhibits high peel adhesion between consecutive sheets. As used herein, the term "high peel adhesion" means that the peel adhesion as measured by the average peak force using modified ASTM D 3330A and 3330F methods as to substrate, dwell time, and sample width as discussed herein is at least about 160 g when the sheets are pulled laterally at 180°. Further, the maximum peel strength is least about 140 g when the sheets are pulled upwardly at 90°.

The maximum peel adhesion strength as measure by the peak force is virtually unlimited. For example, the peak force can be at least about 160, 180, 200, 230, 250, 280, 300, 330, 350, 380, 400, 430, 450, 480, 500 g when the sheets are pulled laterally at 180°. The peak force can be at least about 140, 160, 180, 210, 220, 260, 280, 310, 330, 350, 380, 400, 430, 450, 380 g when the sheets are pulled upward at 90°. The peak force, however, should not be so high so that the substrate tears when the sheets are pulled apart. At such a point, the adhesive no longer functions as a "repositionable" adhesive.

Preferably, to achieve the high peel adhesion of the present invention, the peak force is between about 200 and 800 g, even more preferably between about 300 and 600 g, and most preferably between about 350 and 500 g when the sheets are pulled laterally at 180°. The peak force is between about 150 and 500 g, even more preferably between about 180 and 350 g, and most preferably between about 200 and 300 g when the sheets are pulled upward at 90°.

It will be appreciated that the "high peel adhesion" of the present invention can be achieved in a variety of ways. In general, the peel adhesion characteristics are a function of the type of substrate, adhesive tack, adhesive surface area, primer coating, release coating, as well as the coating techniques themselves. Most preferably, the high peel adhesion is achieved by reducing or eliminating the amount of release coating. In addition, the amount of adhesive may also be increased.

As used herein, "SLINKY®-like" or "accordion-like" fashion means that at least a portion of the stack of flexible sheets are positioned such that the second major surface of a first sheet touches the first major surface of a successive adjacent sheet in the areas where the sheets are adhered by the adhesive but the second major surface of the first sheet does not otherwise substantially contact the first major surface of the successive sheet. An exemplary stack of flexible sheets in which a portion of the stack is in a SLINKY®-like or accordion-like fashion is illustrated in FIGS. 4-8.

As with a commercially available SLINKY® toy device comprised of a spring, the stack of flexible sheets of the present invention is well adapted to be used as a recreational toy. The methods of using the stack of flexible sheets of the present invention are generally described in the original SLINKY® patent, U.S. Pat. No. 2,415,012 to Richard James, which is hereby incorporated by reference in its entirety.

For example, the edges or ends of the stack of flexible sheets may be manipulated so that successive portions of the stack are successively positioned in a SLINKY®-like or accordion-like fashion. More specifically, as the user pulls on an end portion of the stack, the successive sheets 20*a*, 20*b*, 20*c*, 20*d*, 20*e*, 20*f*, 20*g*, 20*h*, etc. are expanded successively in a SLINKS-like or accordion-like fashion. Typically, the user places one end of the stack 10 in the palm of one hand and one end of the stack in the palm of the other hand with the palms facing up and moves one or both hands up and down. The sheets 20, by virtue of being adhered with a high peel adhesion, do not fall apart as the stack is manipulated up and down.

Figure 9:
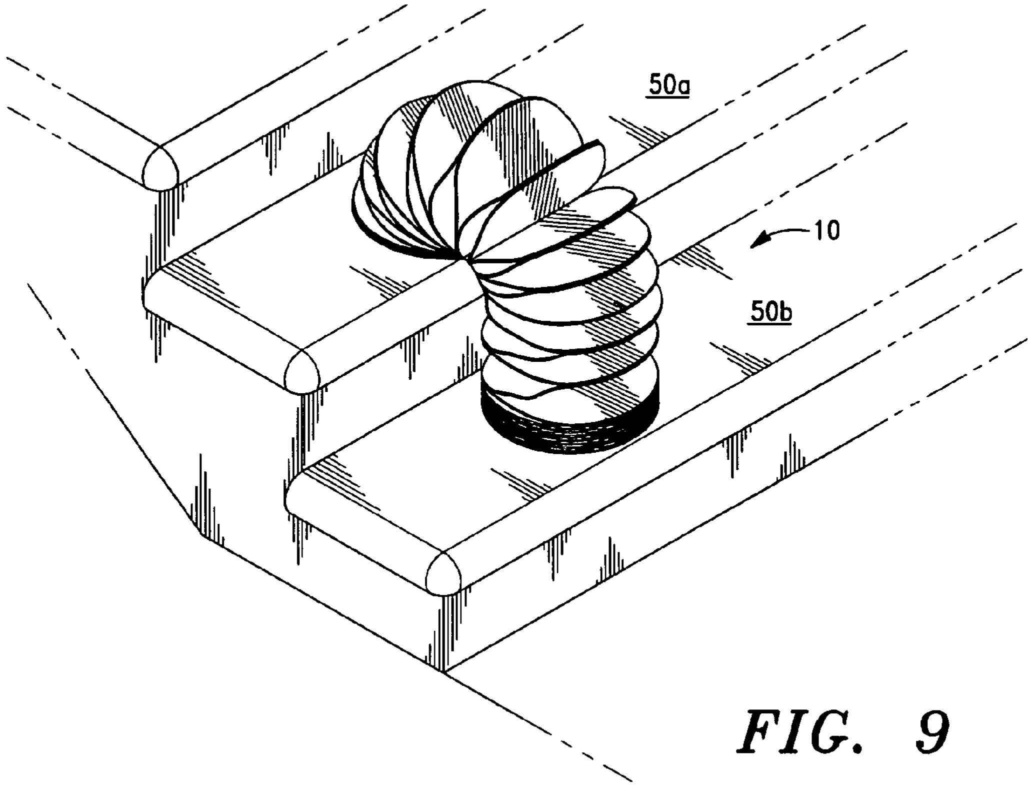
FIG. 9 illustrates a method of using the stack of sheet material shown in FIGS. 1-8 as a toy by "slinking" the stack down a stairway.

FIG. 9 illustrates a method of using the stack 10 of flexible sheets as a toy in another aspect of the present invention. Again, this method parallels the operation of a commercially available SLINKY® toy device. In general, when the stack 10 of flexible sheets is placed on a plurality of progressively lower support surfaces 50 (50*a*, 50*b*), the flexible sheets are capable of "slinking" down the surfaces like the well-known recreational toy.

More specifically, FIG. 9 shows the stack 10 of flexible sheets resting on a first upper support surface 50*a* (such as a stairstep) and a portion of the stack being expanded downwardly in a SLINKY®-like or accordion-like fashion towards a second lower support surface 50*b* (such as another stairstep). As the successive sheets 20*a*, 20*b*, 20*c*, 20*d*, 20*e*, 20*f*, 20*g*, 20*h*, etc. are expanded in a SLINKY®-like or accordion-like fashion, the stack 10 moves from the first upper support surface 50*a* to the second lower support surface 50*b*. The sheets, 20*a-h* etc., by virtue of being adhered with a high peel adhesion, do not fall apart as they move from the first upper support surface 50*a* to the lower support surface 52*b*.

As the stack 10 falls on the second support surface 52, the successive sheets 20*a-h*, etc. are successively positioned such that eventually the first major surface 22 of each sheet rests entirely against the second major surface 25 of the adjacent sheet (i.e., as illustrated in FIG. 1). At this point, the stack 10 of sheets is no longer in a SLINKY®-like or accordion-like position.

It will be appreciated that like a conventional SLINKY® toy, the momentum caused by the movement of the stack 10 may and often does carry at least a portion of the stack of sheets forward. More specifically, after attaining the configuration of FIG. 1, the momentum of the uppermost sheets of the stack 10 causes them rebound from the stack so that the stack again expands downwardly in a SLINKY®-like or accordion-like fashion towards yet another support surface (not shown). In this way, for example, the stack of flexible sheets of the present invention is capable of moving or "slinking" down a plurality of progressively lower support surfaces, such as a stairway.

The stack of flexible sheets of the present invention may be of any desired size and shape. The sheets typically have a diameter or width between of about 4 cm to about 25 cm and most preferably between about 5 and 10 cm. Exemplary shapes include rectangular, half-circle, circular, triangular, and heart-shaped. In addition, the sheets may be shaped like a business logo, such as the CHEVROLET® cross logo. The sheets are most preferably circular in shape like that of the original SLINKY® toy.

Figure 10:
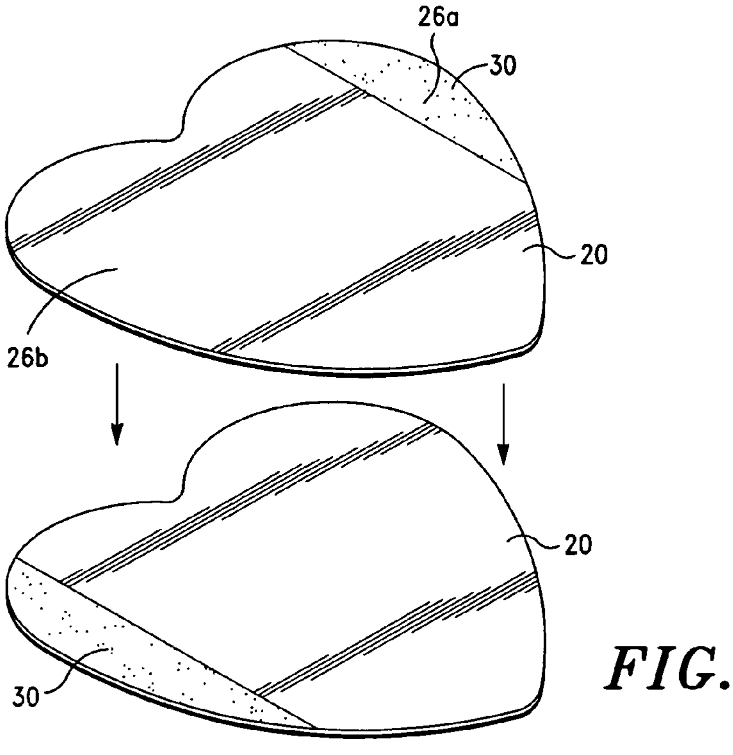
FIG. 10 shows two successive heart-shaped flexible sheets from a stack of flexible sheet material in accordance with the present invention with adhesive on opposite edges.

The amount and location of the adhesive applied to achieve the high peel adhesion between the flexible sheets may depend upon the shape of the sheets themselves. For example, in a heart-shaped stack of sheets, the adhesive is preferably located near the alternating edge of one of the two symmetrical lobes of the heart as shown in FIG. 10.

The number of sheets in the stack may also vary as desired, the upper range being virtually unlimited. Preferably, the stack contains at least about 100 sheets, and more preferably at least about 150, 200, 300, 400, 500, 600, 700, 800, 900, and 1000 sheets. Typically, the stack contains between about 100 and 1000 sheets, even more preferably between about 50 and 600 sheets, and most preferably between about 125 and 300 sheets.

The flexible stack of sheets of the present invention preferably contains at least two sheets that are different from each other. The sheets may be different in any kind of respect. However, the sheets are preferably different in color, printing image, or type of material.

In one embodiment, the stack of flexible sheets comprises sheets having a plurality of colors. For example, the stack may be comprised of a first sheet having a first color and a second sheet having a second color. The first sheet and second sheet are most preferably alternated throughout the stack. The sheets may be colored themselves or printed with a desired color.

Figure 11:
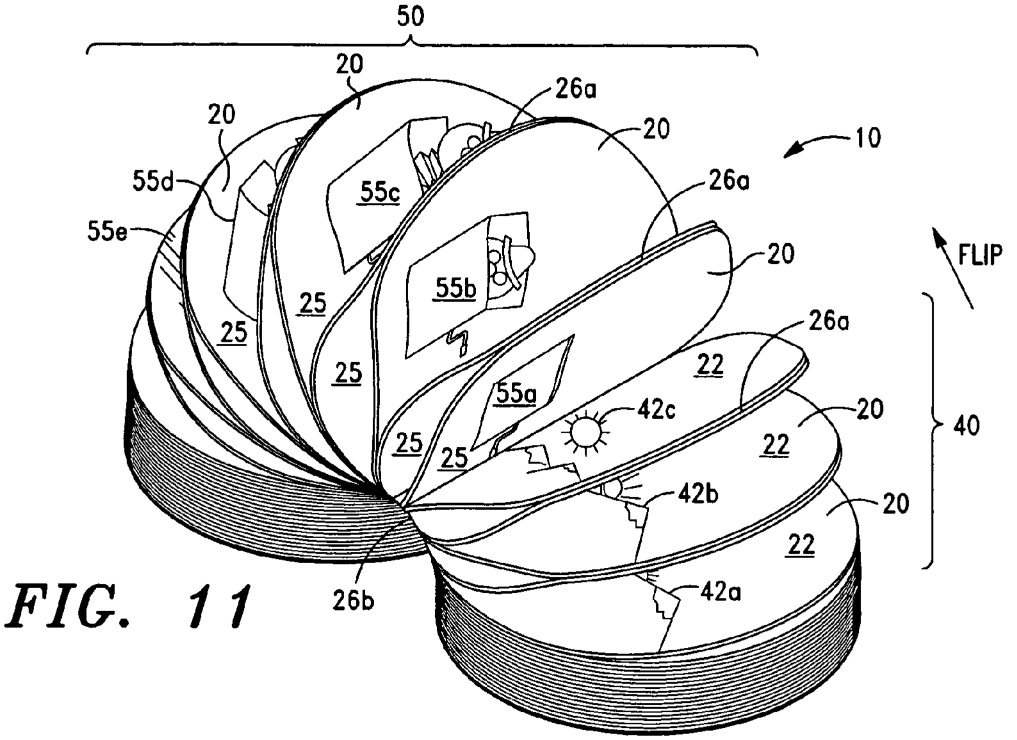
FIG. 11 is a perspective view of a stack of flexible sheet material having a series of images thereon to create an animation flip pad in accordance with the present invention. The stack is expanded along one edge.
Figure 12:
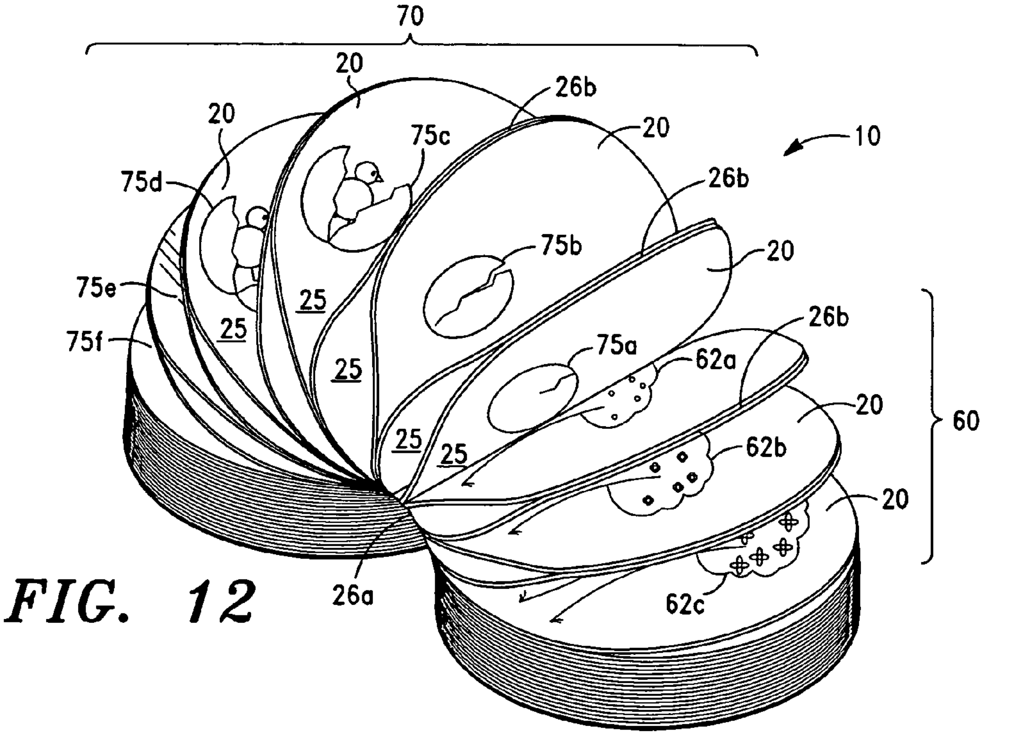
FIG. 12 is a perspective view of the stack shown in FIG. 11. The stack is expanded along the opposite edge of that shown in FIG. 11.
Figure 13:
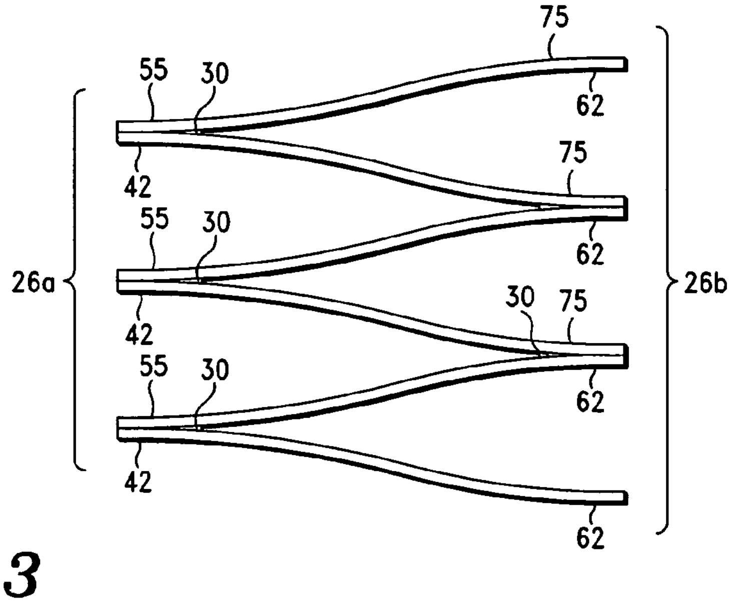
FIG. 13 is an enlarged side view of a portion of the stack shown in FIGS. 11 and 12 showing the placement of various images in the accordion-like animation flip pad. The amount of adhesive on the sheets and thickness of the sheets are exaggerated in the figure.

In another aspect of the present invention, as illustrated in FIGS. 11-13, the stack of flexible sheets having adhesive 30 on alternating opposing edges are printed with at least one series of consecutive images 42 (42*a*, 42*b*, 42*c*, etc.). Thus, the stack of flexible sheets functions like a SLINKY® toy device and like an animated flip pad. More specifically, the consecutive images 42*a*, 42*b*, 42*c* are preferably printed on the first major surface 22 of a plurality of alternating sequential sheets 20 to create a first set of animated flip sheets 40.

To view the animation created by the first series of images 42, the sheets 20 are rapidly flipped at edge 26*a* as indicated by the arrow in FIG. 11. Since adjacent sheets 20 are adhered together at edges 26*a* with adhesive 30, the sheets are flipped at least two at a time (see FIG. 13) along edge 26*a*. This facilitates the flipping process because a good grip can be achieved on the edge 26*a* when the sheets 20 being flipped are two sheets thick. The likelihood that one or more of the sequential images 42*a*, 42*b*, 42*c* in the series will be inadvertently missed during the flipping action is thereby decreased.

It will be appreciated that if the sheets 20 are flipped in a direction opposite the arrow in FIG. 11, the animation created by the sequential images 42*a*, 42*b*, 42*c* will appear to be moving "backwards" (e.g. the sun shown in FIG. 11 will be setting instead of rising). Further, the types of consecutive or sequential images 42 that are printed on the sheets 20 are non-limiting. It will be further appreciated that while FIG. 11 illustrates just three sequential images 42*a*, 42*b*, 42*c*, the stack of flexible sheets 10 may be printed with any number of sequential images in the series. For example, the stack of flexible sheets may be printed with an image on the first surface 22 of every alternating sheet 20 in the entire stack or just a portion of the stack. There may also be multiple series of sequential images so that when the stack is flipped along edge 26*a*, multiple different animation scenes are viewable on the first major surface 22 of the sheets 20.

In accordance with the present invention, there may be more than one sheet 20 between successive images 42 in the animation scheme. There may, for example, be one, three, five, seven, nine, etc. sheets between successive images 42. As an example, image 42*a* is printed on the first major surface of sheet #3, image 42*b* is printed on the first major surface of sheet #7, image 42*c* is printed the first major surface of on sheet #11, image 42*d* is printed on the first major surface of sheet #13, image 42*e* is printed on the first major surface of sheet #15, image 42*f*, is printed on the first major surface of sheet #19, etc. Of course, when more than one sheet is disposed between the consecutive images 42, the animation may appear undesirably choppy or uneven during the flipping action.

The consecutive images 42*a*, 42*b*, 42*c* are preferably located on the first major surface 22 of the sheets 20 so that there is sufficient space to write on the remaining surface of the sheet. The images 42*a*, 42*b*, 42*c* may also be printed with an ink which is relatively faint or "invisible" so that the sheet is still suitable as a writing surface over the ink under normal writing conditions. For example, in one embodiment, the images are produced by using ink extender to create a "water marked" image. Although the ink extender may be mixed with a suitable ink (e.g., an ink having a black or bluish hue and the like), the paper is preferably printed solely with ink extender. A preferred ink extender is commercially available from Water Ink Technologies (Charlotte, N.C.) under Product No. WVG000101. It will be appreciated that numerous methods of producing such "water-marked" images are known to those skilled in the art. See also Pitts et al., U.S. Pat. No. 5,595,829, which is incorporated herein by reference.

In another embodiment, the images are produced by printing with a color that is visibly enhanced when subjected to a colored light source or filter. Preferably, the printed coloring image is comprised of a yellow ink that is substantially visually imperceptible using a white incandescent light source but is readily perceptible when the yellow image is viewed using a blue light source or filter. Suitable yellow inks include Pantone® yellow or process yellow. The blue filter is preferably comprised of a thin plastic that is fashioned into viewing glasses (not shown) such that the filter comprises the lenses of the glasses. Alternatively, the yellow inks can become perceptible when the inks are viewed using a "blue" bulb—i.e., a light bulb that emits primarily a blue color. Because the images are only viewable under such conditions, the multi-functional stack 10 of flexible sheets functions as both a writing pad and a toy, even when the image covers most or all of the major surfaces 22, 25 of the stack.

In yet another embodiment, the images are produced using an "invisible ink." Invisible inks are traditionally defined to involve a broad class of ink formulations which cannot be seen by the unaided eye when applied to a substrate and viewed with "natural" light (e.g., light from the sun) or light from conventional white incandescent lamps and the like. These light forms (as well as other forms which are normally used for general illumination purposes in homes, businesses, and the like) are collectively characterized as "white" light which involves a combination of all the various colored light fractions which fall within a wavelength range of about 300-700 mm. Under these illumination conditions, the ink compositions are essentially colorless. Only after illumination with other light wavelengths outside the visible spectrum do the printed images become visible to the observer.

A number of invisible inks are commercially available, many of which are responsive to ultraviolet light or infrared range. See, e.g., U.S. Pat. No. 5,569,317 (ultraviolet) and U.S. Pat. Nos. 5,611,958 and 5,766,324 (infrared). The present invention preferably uses a so-called ultraviolet ink that fluoresces when subjected to an ultraviolet light source (such as a "black light"). Such ultraviolet markings used in conjunction with ultraviolet light provide a dramatic effect, since the coloring image, which is originally seemingly invisible in visible or normal light, becomes brightly fluorescent and visible under ultraviolet radiation. A preferred ultraviolet ink is commercially available from Craig Adhesives (Newark, N.J.) as Product No. 6933N2.

In another embodiment, the images may be produced using a phosphorescent ink. In general, such phosphorescent inks are substantially "invisible" in normal lighting conditions but "glow in the dark" after an illuminating source has been removed because the atoms remain in an excited state. A preferred phosphorescent ink is commercially available from Craig Adhesives under Product No. 89108A.

In another aspect of the present invention, as shown in FIG. 11-13, the stack of flexible sheets 10 may also have a second set 50, third set 60, and/or fourth set 70 of animated flip sheets. As an example, to create the second set of animated flip sheets 50, the second series of images 55 (55*a*, 55*b*, 55*c*, 55*d*, 55*e*, etc.) is printed on the second major surface 25 of a plurality of sheets 20 to create a second set of animated flip sheets 50 when the sheets are flipped at edge 26*a* (see FIG. 11). The images are most preferably printed on the second major surface 25 of a plurality of alternating sheets 20. As best shown in FIG. 13, the first series of images 42 on alternating sheets and the second set of images 55 on alternating sheets are preferably printed on different sheets.

It will be appreciated that the second set of animated flip sheets 50 can be printed as discussed above with respect to the first set of animated flip sheets 40. For example, there may be one, three, five, seven, nine, etc. sheets between successive images 55. The images can also be printed with any suitable ink.

FIG. 12 illustrates a third set 60 and/or fourth set 70 of animated flip sheets constructed in the stack of flexible sheets of the present invention. In this instance, the sheets are flipped along edge 26*b* (FIG. 12) instead of 26*a* (FIG. 11). More specifically, FIG. 12 illustrates how sequential images 62 (62*a*, 62*b*, 62*c*, etc.) create a third set of animated flip sheets 60, and images 75 (75*a*, 75*b*, 75*c*, 75*d*, 75*f*, etc.) create a fourth set of animated flip sheets 70. The third and fourth sets of animated flip sheets 60, 70 can be printed in various ways as discussed above with respect to the first set of animated flip sheets 40.

FIGS. 11-13 illustrate how the multi-functional stack 10 is well adapted to provide for a plurality (e.g., four) of sets of animated flip sheets. When flipping the sheets along edge 26*a*, a first set of consecutive images 42 printed on the first major surface 22 of alternating sheets are viewable. In addition, the second set of consecutive images 55 printed on the second major surface 25 of alternating sheets are viewable when flipping along edge 26*a*. When the flipping action occurs along edge 26*b*, a third set of consecutive images 62 printed on the first major surface 22 of alternating sheets and a fourth set of consecutive images 75 printed on the second major surface of alternating sheets are viewable.

Figure 14:
FIG. 14 illustrates a stack of flexible sheets in accordance with the present invention in which the edges of the sheets are printed with a peripheral image, such as a corporate logo.

In another aspect of the present invention, as shown in FIG. 14, the multifunctional stack 10 of flexible sheets are printed with one or more peripheral images 80 on the outermost edge or periphery of the stack. The peripheral image 80 is most preferably designed to match the shape of the stack of flexible sheets to form a recognizable three-dimensional object. As an example, for circular stacks 10 of sheets, the peripheral image 80 may take the form of a trademark or logo, such as soda can logo (see FIG. 14) or a tobacco can logo (not shown).

It will be appreciated that the types of peripheral images 80 that may be printed on the stack 10 in accordance with the present invention are non-limiting. For example, the peripheral image 80 may be an animal caricature, as a horse, tiger, moose, mouse, bear, pink panther, the face of a clown, human shape, or a repeating or geometric pattern. The peripheral image 80 may also cover just a portion or all of the outer periphery of the stack 10. The peripheral image 80 may also be printed with any of the suitable ink (e.g., water-marked, invisible, and the like) discussed above.

This present invention is further illustrated by the following examples, which are not intended to limit the scope of the invention.

COMPARATIVE EXAMPLE

In this example, two samples of commercially available "pop-up" POST-IT® notes manufactured by the Minnesota Mining and Manufacturing Company ("3M") were obtained. The two samples were 3 inch×3 inch square stacks of having about 100 sheets. The first pad was comprised of solely of "canary yellow" sheets, and the second pad was comprised solely of "sunbright" sheets.

The notepads were conditioned at 73±3° F. and 50±5% relative humidity for at least 24 hours prior to testing. The amount of peel adhesion in the "as-is" condition was then tested according to modified ASTM D 3330A and 3330F methods using a laboratory certified by the American Association for Laboratory Accreditation. The modifications included the substrate, dwell time, and sample width. The peel adhesion was performed on a ChemInstruments AR-1000 Adhesion Release Tester in conjunction with the EZ lab software program.

The modifications to the test protocol were as follows. First, while the standard method calls for a 24 mm wide sample, the full width of the sample was tested. Second, while the standard method calls for a standard roll down method to assure the samples are applied to the substrate the same way every time, the samples tested were already applied to the substrate. Third, while the standard method calls for removal from a standard stainless steel test panel, the samples were removed from the paper on the sheet below. Fourth, while the standard method calls for a dwell time (the time from application of the adhesive and its removal) of less than one minute to achieve sufficient bond strength, the tested samples had an unknown but sufficiently longer period of time to bond. Fifth, while the standard method calls for not measuring the first inch of data and then collecting two inches of bond strength data, this was not possible with the form the samples were received. Lastly, because of the short bond length, no average forces were recordable. As such, the peak force during removal was measured.

The peak force was measured on each side of the pad. The pad sides were arbitrarily labeled "A" and "B". Three replicates of each side of each sample were tested at each angle.

Two tests were performed. First, the peel adhesion was measured by removing the top sheet from the next sheet by pulling upward at a 90° angle. Second, the peel adhesion was measured by removing the top sheet from the next sheet by pulling laterally at a 180° angle. The results are shown in Table 1 and 2, respectively.

INVENTIVE EXAMPLE

In this example, a stack of flexible sheet material in accordance with the present invention was tested using the procedures outline in the Comparative Example. The inventive stack of flexible sheet material was comprised of paper die cut into a circular shape 2⅞ inches wide. The paper was coated as discussed herein with a water-based release coating commercially available from Craig Adhesives as Product No. 3991 REL one surface and a primer commercially available from Craig Adhesives as Product No. 3991 PR on the opposite surface. The adhesive covered about 20% of the surface area of the sheet.

The inventive stack of flexible sheets were produced by coating a continuous flexible substrate with a primer coating (Product No. 3991PR from Craig Adhesive & Coatings) and a release coating (Product No. 3991 REL from Craig Adhesive & Coatings). A repositionable microsphere pressure sensitive (Product No. 3991 PIL from Craig Adhesive & Coatings) was then applied to the coated substrate.

The results are shown in Tables 1 and 2.

TABLE 1

| 90° Peel | 90° Peel | | | | | |
|---|---|---|---|---|---|---|
| | Side "A" | | Side "B" | | Average of Both Sides | |
| | Avg. of Peak Values, grams | σ grams | Avg. of Peak Values, grams | σ grams | Avg. of Peak Values, grams | σ grams |
| 3M Canary Yellow | 97.8 | 4.5 | 125.4 | 0.6 | 111.6 | 15.4 |
| 3M Sunbright Yellow | 89.3 | 8.5 | 109.2 | 12.7 | 99.3 | 14.5 |
| Round (Inventive) | 233.8 | 10.1 | 239.5 | 15.7 | 236.7 | 12.2 |

TABLE 2

| 180° Peel | 180° Peel | | | | | |
|---|---|---|---|---|---|---|
| | Side "A" | | Side "B" | | Average of Both Sides | |
| | Avg. of Peak Values, grams | σ grams | Avg. of Peak Values, grams | σ grams | Avg. of Peak Values, grams | σ grams |
| 3M Canary Yellow | 106.7 | 10.4 | 127.3 | 7.7 | 116.9 | 13.9 |
| 3M SunbrightYellow | 109.7 | 10.5 | 126.8 | 16.9 | 118.2 | 15.7 |
| Round (Inventive) | 373.3 | 37.8 | 474.6 | 16.7 | 423.9 | 61.3 |

While specific embodiments have been shown and discussed, various modifications may of course be made, and the invention is not limited to the specific forms or arrangement of parts and steps described herein, except insofar as such limitations are included in the following claims. Further, it will be understood that certain features and sub-combinations are of utility and may be employed without reference to other features and sub-combinations. This is contemplated by and is within the scope of the claims.

What is claimed and desired to be secured by Letters Patent is as follows:

1. A method of using a stack of flexible sheets as a recreational toy comprising:

providing a stack of non-folded sheets, said sheets each having a first major surface and an opposite second major surface extending between two substantially opposite edges, and said sheets being disposed one on top of another; and said sheets having adhesive coated on said second major surface adjacent one opposite edge and being free of adhesive on the other opposite edge; and said sheets being stacked with the adhesive on successive sheets disposed on alternate adjacent opposite edges; and spreading the stack of flexible sheets so at least a portion of the stack of flexible sheets are positioned such that the second major surface of a first sheet touches the first major surface of a successive adjacent sheet in the areas where the sheets are adhered by the adhesive but the second major surface of the first sheet does not otherwise substantially contact the first major surface of a successive sheet where there is no adhesive, said spreading step being performed by a user grasping one end of the stack in a palm of one hand and one end of the stack in a palm of the other hand.

2. The method of claim 1 further comprising the step of further spreading the stack of flexible sheets so that successive portions of the stack are successively positioned in an accordion-like fashion.

3. The method of claim 1 wherein said spreading step is performed by having a user pull on an end portion of the stack.

4. The method of claim 1 further comprising the step of having said user moving one or both hands up and down.

5. A method of using a stack of flexible sheets as a recreational toy comprising:

providing a stack of non-folded sheets, said sheets each having a first major surface and an opposite second major surface extending between two substantially opposite edges, and said sheets being disposed one on top of another; and said sheets having adhesive coated on said second major surface adjacent one opposite edge and being free of adhesive on the other opposite edge; and said sheets being stacked with the adhesive on successive sheets disposed on alternate adjacent opposite edges; and spreading the stack of flexible sheets so at least a portion of the stack of flexible sheets are positioned such that the second major surface of a first sheet touches the first major surface of a successive adjacent sheet in the areas where the sheets are adhered by the adhesive but the second major surface of the first sheet does not otherwise substantially contact the first major surface of a successive sheet where there is no adhesive, wherein said spreading step is performed by providing said stack on a first upper support surface and then permitting said stack to expand downwardly to a second lower support surface.

6. The method of claim 5 further comprising the step of permitting said stack to rest on said second lower support surface such the first major surface of each sheet rests entirely against the second major surface of the adjacent sheet.

7. The method of claim 6 further comprising the step of permitting one or more upper sheets of the stack to rebound and momentously move to a third support surface.

8. The method of claim 7 wherein said third support surface is lower than said second support surface.

9. The method of claim 1 wherein the peel adhesion between the successive sheets is at least 150 g when the sheets are pulled laterally at 180 degrees.

10. The method of claim 1 wherein the peel adhesion between the successive sheets is at least 200 g when the sheets are pulled laterally at 180 degrees.

11. The method of claim 1 wherein the peel adhesion between the successive sheets is at least 250 g when the sheets are pulled laterally at 180 degrees.

12. The method of claim 1 wherein the peel adhesion between the successive sheets is at least 300 g when the sheets are pulled laterally at 180 degrees.

13. The method of claim 1 wherein the peel adhesion between the successive sheets is at least 400 g when the sheets are pulled laterally at 180 degrees.

14. The method of claim 1 wherein the peel adhesion between the successive sheets is at least 500 g when the sheets are pulled laterally at 180 degrees.

15. The method of claim 1 wherein said flexible sheet material is comprised of paper, vellum, or plastic film.

16. The method claim 1 wherein said stack of flexible sheets is spread in semi-circular or arcuate form.

* * * * *